(12) United States Patent
Tong et al.

(10) Patent No.: US 10,713,369 B2
(45) Date of Patent: Jul. 14, 2020

(54) METHOD AND DEVICE FOR ACCESS CONTROL

(71) Applicant: ZTE Corporation, Shenzhen (CN)

(72) Inventors: Yao Tong, Shenzhen (CN); Yihui Peng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 177 days.

(21) Appl. No.: 15/505,502

(22) PCT Filed: Apr. 17, 2015

(86) PCT No.: PCT/CN2015/076913
§ 371 (c)(1),
(2) Date: Feb. 21, 2017

(87) PCT Pub. No.: WO2016/026320
PCT Pub. Date: Feb. 25, 2016

(65) Prior Publication Data
US 2017/0277900 A1 Sep. 28, 2017

(30) Foreign Application Priority Data

Aug. 22, 2014 (CN) .......................... 2014 1 0419246

(51) Int. Cl.
*G06F 21/60* (2013.01)
*H04L 29/06* (2006.01)
*G06Q 10/06* (2012.01)

(52) U.S. Cl.
CPC ........... *G06F 21/604* (2013.01); *G06Q 10/06* (2013.01); *H04L 29/06* (2013.01); *H04L 63/104* (2013.01); *H04L 63/20* (2013.01)

(58) Field of Classification Search
CPC ...... G06F 21/10; G06F 21/31; G06F 21/6218; G06F 2221/2141; H04L 63/102
(Continued)

(56) References Cited

U.S. PATENT DOCUMENTS 6,564,215 B1 * 5/2003 Hsiao ................. G06F 11/1469
7,028,180 B1 * 4/2006 Aull ...................... G06F 21/335
713/156
(Continued)

FOREIGN PATENT DOCUMENTS

| CN | 1967560 A | 5/2007 |
| CN | 101038635 A | 9/2007 |

(Continued)

OTHER PUBLICATIONS

Chunyan, "A Role Based Secure Workflow Model", Grid and Cooperative Computing, Aug. 1, 2007, Sixth International Conference on IEEE, pp. 764-774, XP031129182.
(Continued)

*Primary Examiner* — Khalil Naghdali
(74) *Attorney, Agent, or Firm* — Cantor Colburn LLP

(57) ABSTRACT

The disclosure discloses a method and device for access control. The method includes: when a group of tasks are executed, controlling an access of a subject to an object according to operation permission corresponding to each of the tasks in the group of tasks. The device comprises a control component arranged to, when a group of tasks are executed, control an access of a subject to an object according to operation permission corresponding to each of the tasks in the group of tasks.

12 Claims, 4 Drawing Sheets

(58) Field of Classification Search
USPC .......................................................... 726/28
See application file for complete search history.

(56) References Cited

U.S. PATENT DOCUMENTS

| | | |
|---|---|---|
| 2003/0149714 A1 | 8/2003 | Casati |
| 2003/0177046 A1* | 9/2003 | Socha-Leialoha ... G06Q 10/103 |
| | | 717/101 |
| 2006/0090208 A1* | 4/2006 | Smith ................... G06F 21/604 |
| | | 726/26 |
| 2011/0191485 A1* | 8/2011 | Umbehocker ........ G06F 21/604 |
| | | 709/229 |
| 2011/0277017 A1* | 11/2011 | Ivanov ................ G06F 21/6218 |
| | | 726/4 |
| 2013/0111583 A1* | 5/2013 | Hernandez .......... G06F 21/6218 |
| | | 726/21 |
| 2013/0326580 A1* | 12/2013 | Barclay ................ H04L 63/101 |
| | | 726/1 |

FOREIGN PATENT DOCUMENTS

| | | |
|---|---|---|
| CN | 101226615 A | 7/2008 |
| CN | 101656625 A | 2/2010 |
| CN | 103067797 A | 4/2013 |

OTHER PUBLICATIONS

European Search Report for corresponding application EP15834615; Report dated Aug. 3, 2017.
International Search Report for corresponding application PCT/CN2015/076913 filed on Apr. 17, 2015; dated Jun. 3, 2015.

* cited by examiner

METHOD AND DEVICE FOR ACCESS CONTROL

TECHNICAL FIELD

The disclosure relates to the field of communications, and in particular to a method and device for access control.

BACKGROUND

Workflow refers to a process automation of transferring texts, information and tasks among participants in a process of working according to a group of pre-defined rules for a certain commercial purpose. Since the workflow separates process logic and function logic, thereby increasing a flexibility of a system, an automation of an approval process within an enterprise is achieved with a use of the workflow, which may greatly improve a service processing efficiency of the enterprise. Workflow Management System (WMS) is a software system that completes definition and management of the workflow and advances an execution of a workflow instance according to pre-defined workflow logic.

In a real office application, a single execution of a workflow requires a coordination of different roles of a plurality of different departments. A security policy of the enterprise determines which role may do which work and which role cannot do which work in a life cycle of the workflow. Therefore, a group of access control mechanisms are required in the WMS to ensure that each step of the workflow is undertaken and completed by a correct role.

An Access control (AC) is mainly used to limit an access of an illegal subject to key resources, and to prevent an intrusion of illegal users or destruction due to inadvertent operations of legitimate users. An AC technology generally includes three elements.

Subject: an active party that initiates an access operation usually refers to a user or a process of the user, including the user, a user group, a terminal, a host, or an application, and the subject may access an object.

Object: the object being accessed may be a byte, a field, a record, a program, a file, a processor, a memory, a network contact and so on.

Security access policy: a group of rules are used to determine whether the subject has an ability of accessing to the object.

There are three main traditional access control mechanisms: Discretionary Access Control (DAC), Mandatory Access Control (MAC) and Role-Based Access Control (RBAC). The DAC may provide users with flexible and easy way to access data, but it is low in security and is easy to be bypassed by illegal users for access permission. Although the MAC is better in security than the DAC, since the MAC gives a certain level of security for each user and file and does not allow a single user to determine access permission, and only a system administrator may determine the access permission of users and files, it is not very flexible and convenient for users to use. A basic idea of the RBAC is that the access permission granted to users are usually determined by a role of the user in an organization, and the access permission and control are made according to the role of the user in the organization, but the user cannot autonomously pass the access permission to others. The biggest feature of the RBAC is to associate the access permission with the role. Different roles have different permission. A power that the user has cannot exceed the permission required when the user executes the work. When responsibilities of the users changes, the role authorized to them is changed so as to change the permission of the users, thus reducing a complexity of management and also describing a more complex security strategy.

However, the above three access control techniques are based on subject-object access control thinking. As long as the subject has specific access permission to the object, the subject may access the object. This static authorization cannot be closely related to a transaction processing flow in the application, so it is difficult for the system to grant and revoke the permission (or roles) in a timely and accurate manner. In a practical application, often the time that the user has permission is longer than the time that the user needs permission, resulting in potential insecurity.

SUMMARY

The embodiments of the disclosure provide a method and device for access control so as at least to solve a problem of insecurity caused by static authorization adopted in the related art.

In an embodiment of the disclosure, a method for access control is provided, including: when a group of tasks are executed, controlling an access of a subject to an object according to operation permission corresponding to each of the tasks in the group of tasks.

In an example embodiment, before the group of tasks are executed, the method further includes: obtaining the operation permission corresponding to each of the tasks in the group of tasks according to a preset correspondence relationship between each of the tasks in the group of tasks and the operation permission.

In an example embodiment, before obtaining the operation permission corresponding to each of the tasks in the group of tasks according to the preset correspondence relationship between each of the tasks in the group of tasks and the operation permission, the method further includes: receiving a request for a workflow initiated by the subject; and obtaining the group of tasks for each process completing the workflow.

In an example embodiment, obtaining the group of tasks for each process completing the workflow includes: initializing the workflow to generate a workflow instance, and dividing the workflow instance into the group of tasks.

In an example embodiment, dividing the workflow instance into the group of tasks includes: assigning the group of tasks that need to be executed according to different application programming interfaces called in the workflow instance.

In an example embodiment, obtaining the operation permission corresponding to each of the tasks in the group of tasks according to the preset correspondence relationship between each of the tasks in the group of tasks and the operation permission includes: obtaining a role corresponding to the subject executing each of the tasks according to a preset correspondence relationship between the subject and the role; obtaining a first operation permission corresponding to the role according to a preset correspondence relationship between the role and the operation permission; and taking an intersection of a second operation permission corresponding to the task in the preset correspondence relationship between each of the tasks in the group of tasks and the operation permission, and the first operation permission corresponding to the obtained role corresponding to the subject executing the task as the operation permission for each of the tasks.

In an example embodiment, controlling the access of the subject to the object according to the operation permission corresponding to each of the tasks includes: determining whether the subject is allowed to access to the object according to the operation permission corresponding to a current task in a process of executing each of the tasks; and executing the access to the object in a case of allowing the subject to access to the object.

In an example embodiment, after executing the access to the object, the method further includes: revoking the operation permission corresponding to each of the tasks in the group of tasks and ending each of the tasks in the group of tasks.

In an example embodiment, revoking the operation permission corresponding to each of the tasks in the group of tasks includes: determining a life cycle of the role according to a level of the role corresponding to the subject executing each of the tasks in the group of tasks; and revoking the operation permission corresponding to each of the tasks in the group of tasks when the life cycle expires.

In another embodiment of the disclosure, a device for access control is provided, including: a control component arranged to, when a group of tasks are executed, control an access of a subject to an object according to operation permission corresponding to each of the tasks in the group of tasks.

In an example embodiment, the device further includes: a first obtaining component arranged to obtain the operation permission corresponding to each of the tasks in the group of tasks according to a preset correspondence relationship between each of the tasks in the group of tasks and the operation permission.

In an example embodiment, the device further includes: a receiving component arranged to receive a request for workflow initiated by the subject; and a second obtaining component arranged to obtain the group of tasks for each process completing the workflow.

In an example embodiment, the first obtaining component includes: a first obtaining element arranged to obtain a role corresponding to the subject executing each of the tasks according to a preset correspondence relationship between the subject and the role; a second obtaining element arranged to obtain a first operation permission corresponding to the role according to a preset correspondence relationship between the role and the operation permission; and a calculating component arranged to take an intersection of a second operation permission corresponding to the task in the preset correspondence relationship between each of the tasks in the group of tasks and the operation permission and the first operation permission corresponding to the obtained role corresponding to the subject executing the task as the operation permission for each of the tasks.

In an example embodiment, the control component includes: a determining element arranged to determine whether the subject is allowed to access to the object according to the operation permission corresponding to a current task in a process of executing each of the tasks; and an executing element arranged to execute the access to the object in a case of allowing the subject to access to the object.

In an example embodiment, the device further includes: a revoking component arranged to revoke the operation permission corresponding to each of the tasks in the group of tasks and end each of the tasks in the group of tasks after executing the access to the object.

The embodiment of the disclosure provides a preset correspondence relationship between each of the tasks in the group of tasks and the operation permission. When executing the task, the subject dynamically obtains the operation permission corresponding to the task, and the access to the object is controlled by the operation permission so as to dynamically configure the operation permission corresponding to each of the tasks in the group of tasks, and grant and revoke the operation permission in a timely and accurate manner, avoiding potential insecurity.

BRIEF DESCRIPTION OF THE DRAWINGS

The drawings are described here to provide further understanding of the disclosure, and form a part of the disclosure. The schematic embodiments and description of the disclosure are adopted to explain the disclosure, and do not form improper limits to the disclosure. In the drawings.

DETAILED DESCRIPTION

The disclosure is described below with reference to the drawings and the embodiments in detail. It needs to be noted that the embodiments of the disclosure and the characteristics in the embodiments may be combined under the condition of no conflicts.

Figure 1:
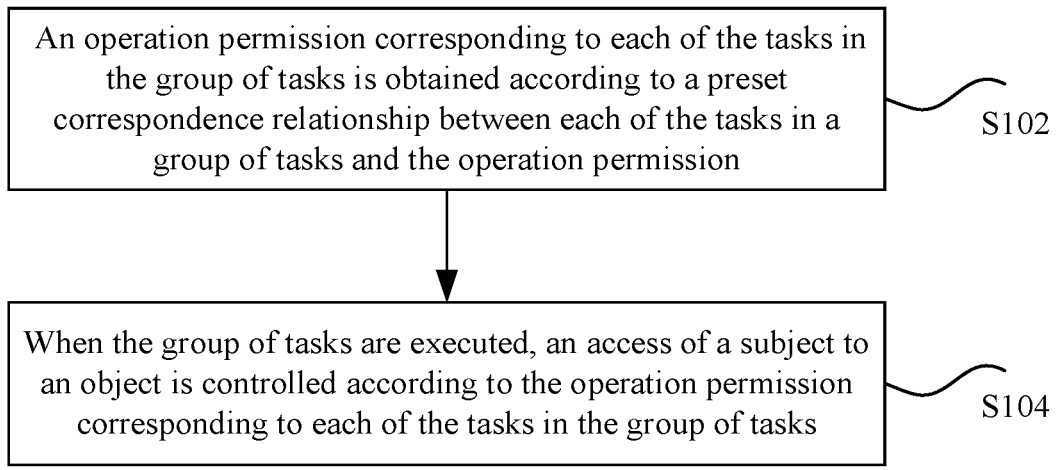
FIG. 1 is a flowchart diagram of a method for access control according to an embodiment of the disclosure.

One embodiment of the disclosure provides a method for access control. FIG. 1 is a flowchart diagram of a method for access control according to an embodiment of the disclosure. As shown in FIG. 1, the method mainly includes the following steps.

Step S102: An operation permission corresponding to each of the tasks in the group of tasks is obtained according to a preset correspondence relationship between each of the tasks in a group of tasks and the operation permission.

Step S104: When the group of tasks are executed, an access of a subject to an object is controlled according to the operation permission corresponding to each of the tasks in the group of tasks.

In an alternative embodiment of the disclosure, before executing Step S102, the method may further include: a request for a workflow initiated by the subject is received; and the group of tasks for each process completing the workflow are obtained.

In an alternative embodiment of the disclosure, obtaining the group of tasks for each process completing the workflow may include: the workflow is initialized to generate a workflow instance, and the workflow instance is divided into the group of tasks.

In an alternative embodiment of the disclosure, when initializing the workflow, the user initiating the request is first assigned a session in which a corresponding workflow template is obtained according to an identifier of the workflow, and the workflow template is filled according to parameters carried in messages submitted by the workflow initiated by the user to complete the initialization of the workflow.

In an alternative embodiment of the disclosure, when dividing the workflow instance into the group of tasks, the group of tasks that need to be executed is assigned according to different application programming interfaces called in the workflow instance.

For example, a preset operation priority table, an operation definition table, a permission definition table, and a role definition table may be inquired according to the role corresponding to each of the tasks in the group of tasks and an operation to be executed by each of the tasks in the group of tasks, and the operation permission that each of the tasks in the group of tasks has is determined. In an alternative embodiment of the disclosure, when obtaining operation permission corresponding to each of the tasks in the group of tasks, a role corresponding to the subject executing each of the tasks may be obtained according to the preset correspondence relationship between the subject and the role, then the operation permission corresponding to the role is obtained according to the preset correspondence relationship between the role and the operation permission; and the intersection of a first operation permission corresponding to each of the tasks in the group of tasks in the preset correspondence relationship between each of the tasks in the group of tasks and the operation permission and a second operation permission corresponding to the obtained role corresponding to the subject executing each of the tasks in the group of tasks is taken as the operation permission for each of the tasks.

In an alternative embodiment of the disclosure, when controlling the access of a subject to an object, it is first determined whether the subject is allowed to access to the object according to the operation permission corresponding to a current task in a process of executing each of the tasks; and the access to the object is executed in a case of allowing the subject to access to the object.

In an alternative embodiment of the disclosure, after executing the access to the object, the operation permission corresponding to each of the tasks in the group of tasks may be further revoked and each of the tasks in the group of tasks may be ended.

In an alternative embodiment of the disclosure, when revoking the operation permission corresponding to each of the tasks in the group of tasks, a life cycle of the role may be determined first according to a level of the role corresponding to the subject executing each of the tasks in the group of tasks; and the operation permission corresponding to each of the tasks in the group of tasks may be revoked when the life cycle expires.

Figure 2:
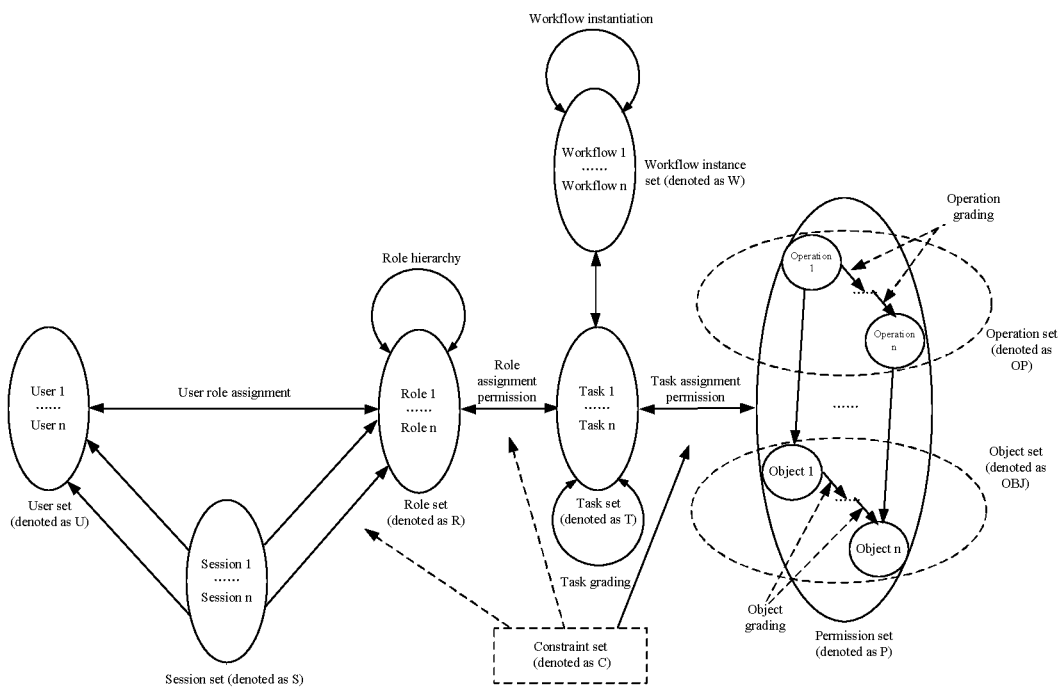
FIG. 2 is an access control model diagram according to an embodiment of the disclosure.

In an alternative embodiment of the disclosure, a multi-level access control model may be provided as shown in FIG. 2 to implement a correspondence relationship between each of the tasks in the group of tasks and the operation permission. As shown in FIG. 2, the model includes 10 object sets and 7 object relationship sets.

Further, the 10 object sets include: 1. user set U, $\{u_1 u_2 \ldots u_n\}$; 2. role set R, $\{r_1 r_2 \ldots r_n\}$; 3. session set S, $\{s_1 s_2 \ldots s_n\}$; 4. task set T, $t_1 t_2 \ldots t_n\}$; 5. operation set OP, $\{op_1 op_2 \ldots op_n\}$; 6. permission set P, $\{p_1 p_2 \ldots p_n\}$; 7. object set OBJ, $\{obj_1 obj_2 \ldots obj_n\}$; 8. workflow instance set W, $\{w_1 w_2 \ldots w_n\}$; 9. constraint set C, $\{c_1 c_2 \ldots c_n\}$; and 10. permission valid time set T, $\{(t_1, t_2), \ldots (t_i, t_i+1), \ldots (t_n, t_n+1)\}$.

In addition, a permission valid time set T is a binary relationship set of a time relationship, such as a workflow, and is divided into three steps, namely, three tasks. The corresponding time periods are respectively t1-t2, t2-t3, t3, t4, and the permission valid time set T={(t1, t2), (t2, t3), (t3, t4)}.

The 7 object relationship sets may be: 1. user role assignment relationship; 2. role hierarchical relationship; 3. role task assignment relationship; 4. subordination between the task and the workflow; 5. task permission assignment relationship; 6. operation hierarchical relationship; and 7. Object hierarchical relationship.

Further, users refer to all the people using the WMS; the role is a function of a job or a title of the job inside an operator, and refers to powers and responsibilities granted by the members of the role, such as operating room operators, portal administrators, background administrators, etc.; the session refers to a set of resources allocated by the WMS for the workflow instance starting from an instantiation of the workflow; the task is the activity executed in a workflow instance to complete a function, such as free period expiration reminder, e-mail notification to users, modifying service capabilities, etc.; the operation refers to an activity such as access or change executed on data in a portal database; the operation permission is a permission of accessing one or more objects in the system in a specific way and the user who has the operation permission in the system may execute the corresponding operation; and the object refers both to a data object of a computer system and to a resource object represented by data, such as an available conversation time recorded by the remaining time in a portal database table of the operator and available amount of money recorded by the remaining amount field.

In FIG. 2, "user" and "role", "role" and "task", and "task" and "permission" are connected by double arrows to indicate a user role assignment (denoted as UR) relationship, a role task Assignments (denoted as RT) relationship and a task permission assignment (denoted as TP) relationships are "many-to-many" relationship. That is, a user may have multiple roles, a role may be owned by multiple users; a role may be assigned to multiple tasks, a task may also have multiple roles; a task may have multiple permissions, and the operation permission may be assigned to multiple tasks. The role and operation permission that the task has is valid only in the life cycle of the task and may only obtain the minimum permissions allowed to execute the task. If the task is completed, the role and permission that the task has will be automatically retracted so as to realize the minimum permissions and dynamic authorization. For example, the role corresponding to the subject that executes the current task may be obtained through the user role assignment relationship and the role task assignment relationship, and then the corresponding operation permission may be obtained according to the task permission assignment relationship.

Figure 3:
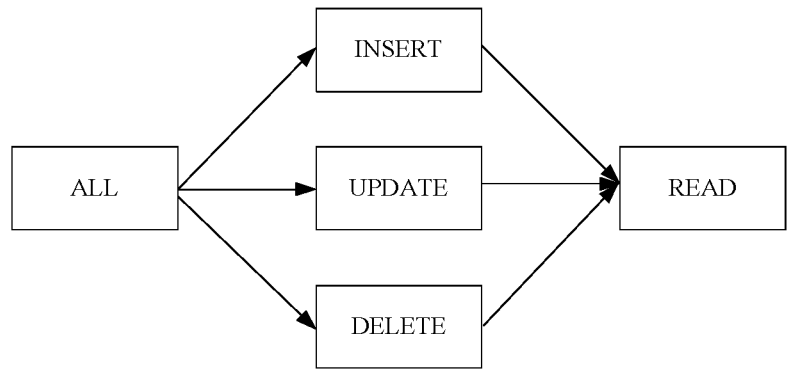
FIG. 3 is a schematic diagram of permission grading according to an embodiment of the disclosure.

In an alternative embodiment of the disclosure, the role may be divided into six levels from the highest to the lowest in duration of the life cycle. The role of a high level has a longer life cycle, and may execute more operations. The task is divided into three levels according to priorities: high, common and low levels. The task with a high level may be executed first. If multiple tasks have the same levels, the tasks are executed according to the order of task creation. The operations are divided into five levels according to the level of the permission: ALL, INSERT, UPDATE, DELETE and READ. An inheritance relationship between any two of the operations is as shown in FIG. 3. The ALL operation has the maximum permission and may execute INSERT, UPDATE, DELETE, and READ operations; the INSERT operation may execute INSERT, and READ operations; the UPDATE operation may execute UPDATE, and READ operations; the DELETE operation may execute DELETE, and READ operations; and the READ operation has the minimum operation permission and may only execute READ operation. In addition, the object may be divided into four levels in the embodiment of the disclosure according to an importance of the object: a top secret level, a secret level, a confidentiality level, and a general level. The object above the confidentiality level may only be accessed by the task approved by the user who has the permission of a super administrator.

Figure 4:
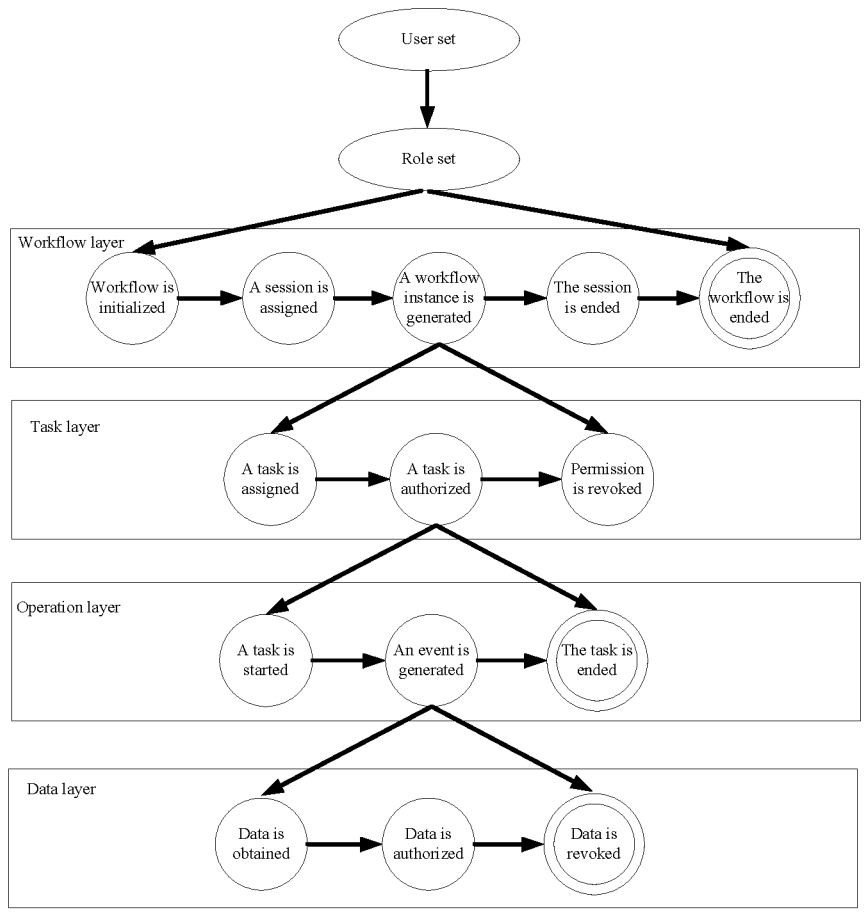
FIG. 4 is a schematic diagram of an actual workflow execution according to an embodiment of the disclosure.

FIG. 4 is a schematic diagram of an actual workflow execution according to the above access control model according to an embodiment of the disclosure. As shown in FIG. 4, the following steps may be included in a process of execution.

Step 1: A user initiates a workflow by clicking a page on a portal, and a role set that the user uses is determined by a workflow engine according to a user role association table.

Step 2: After determining a corresponding role set, a WMS assigns a session to a message. In this session, a corresponding workflow template is found according to a workflow name and the template is filled with parameters in the message to complete an initialization of the workflow and generate a workflow instance.

Step 3: In the generated workflow instance, the tasks are assigned according to the called different Application Programming Interfaces (API), and the WMS determines an operation permission set that the task has again according to the user role association table, a role task association table and a role definition table to complete authorization operation of the task.

Step 4: After the task has been executed, the access permission to the object is applied in a manner of sending an event to an access control component, and the access control component determines whether the subject is allowed to access to the object according to the operation permission that the task has.

Step 5: If the operation permission of the task is enough to access the object, the access permission of the task is revoked after the task completes the access to the object, and the task is ended.

Compared with the related art, in the embodiment of the disclosure, the "isolation" layer of the task is inserted between the role and the operation permission, achieving dynamically revoking the operation permission with the end of the task, and effectively solving the problem in the related art that there are security vulnerabilities due to too long timeliness of the operation permission given to the user (role).

Figure 5:
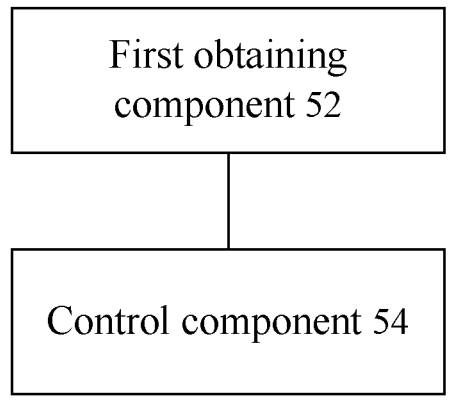
FIG. 5 is a structural schematic diagram of a device for access control according to an embodiment of the disclosure.

According to an embodiment of the disclosure, there is also provided a device for access control. FIG. 5 is a structural schematic diagram of a device for access control according to an embodiment of the disclosure. As shown in FIG. 5, the device mainly includes: a first obtaining component 52 arranged to obtain operation permission corresponding to each of the tasks in the group of tasks according to a preset correspondence relationship between each of the tasks in a group of tasks and the operation permission; and a control component 54 coupled to the first obtaining component 52 and arranged to, when the group of tasks are executed, control an access of a subject to an object according to operation permission corresponding to each of the tasks in the group of tasks.

In an alternative embodiment of the disclosure, the device may further include: a receiving component arranged to receive request for a workflow initiated by the subject; and a second obtaining component arranged to obtain the group of tasks for each process completing the workflow.

In an alternative embodiment of the disclosure, the first obtaining component may include: a first obtaining element arranged to obtain a role corresponding to the subject executing each of the tasks according to a preset correspondence relationship between the subject and the role; a second obtaining element arranged to obtain a first operation permission corresponding to the role according to a preset correspondence relationship between the preset role and the operation permission; and a calculating component arranged to take an intersection of a second operation permission corresponding to the task in the preset correspondence relationship between each of the tasks in the group of tasks and the operation permission and the first operation permission corresponding to the obtained role corresponding to the subject executing the task as the operation permission for each of the tasks.

In an alternative embodiment of the disclosure, the control component may include: a determining element arranged to determine whether the subject is allowed to access to the object according to the operation permission corresponding to a current task in a process of executing each of the tasks; and an executing element arranged to execute the access to the object in a case of allowing the subject to access to the object.

In an alternative embodiment of the disclosure, the device may further include: a revoking component arranged to revoke the operation permission corresponding to each of the tasks in the group of tasks and end each of the tasks in the group of tasks after executing the access to the object.

In the implementation process, the device for access control provided by the embodiments of the disclosure has the technical features corresponding to the abovementioned method for access control, and will not be described again herein.

The technical solutions provided by the embodiments of the disclosure will be described below with reference to specific embodiments.

Example Embodiment 1

Figure 6:
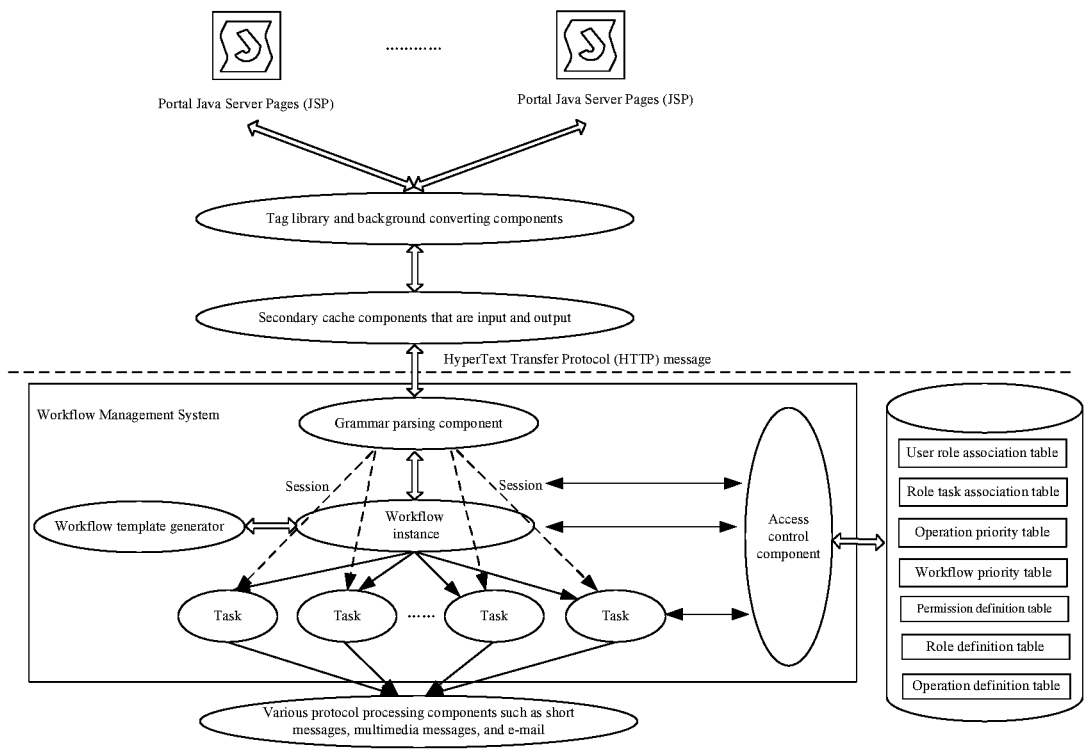
FIG. 6 is a schematic diagram of a system structure according to a first example embodiment of the disclosure.

FIG. 6 is a schematic diagram of a system structure of a multi-level access control model used in an embodiment of the disclosure. A portal foreground part is above a dotted line in the figure, which consists of a large number of Java Server Pages (JSP) files, tag library and background converting components, and secondary cache components that are input and output. JSP is a dynamic web page technology standard. The Java file (such as the Webpage file with the suffix *.jsp) is formed by inserting Java program scriptlets and JSP tags into a traditional HyperText Markup Language (HTML) file (such as the page file with the suffix called *.htm and *.html). A portal foreground component developed with the JSP is cross-platform and may run on different operating systems.

The WMS (including the access control device in the embodiment of the disclosure) part is below the dotted line. After receiving a HyperText Transfer Protocol (HTTP) message sent from the foreground, it is de-tagged by a grammar parsing component first. A name of the workflow to be executed and workflow parameter information is resolved from a tag of the HTTP message, and then the parameter is filled in the workflow template defined by a workflow template generator so as to generate a workflow instance to be executed. At the same time, an access control component assigns a priority to the workflow instance according to a workflow priority table. The workflow instance with a high priority is preferentially allocated with system resources and is executed preferentially. In a process of the workflow instantiation, the WMS assigns a session number uniformly for each workflow instance and generates a session corresponding to the workflow instance. After the workflow completes the instantiation, the WMS divides the workflow instance into a single task according to called different APIs in the workflow instance. The device for access control executes a role corresponding to each task according to a user role association table, a role task association table and a role definition table, and then the device for access control inquires an operation priority table, an operation definition table, a permission definition table, and the role definition table again according to the operation to be executed by the task to determine whether the task has sufficient permissions to operate specified resource. The specified resource maly only be operated only on the operation premise that both the role level and the operation permission of the task meet the conditions.

Example Embodiment 2

Figure 7:
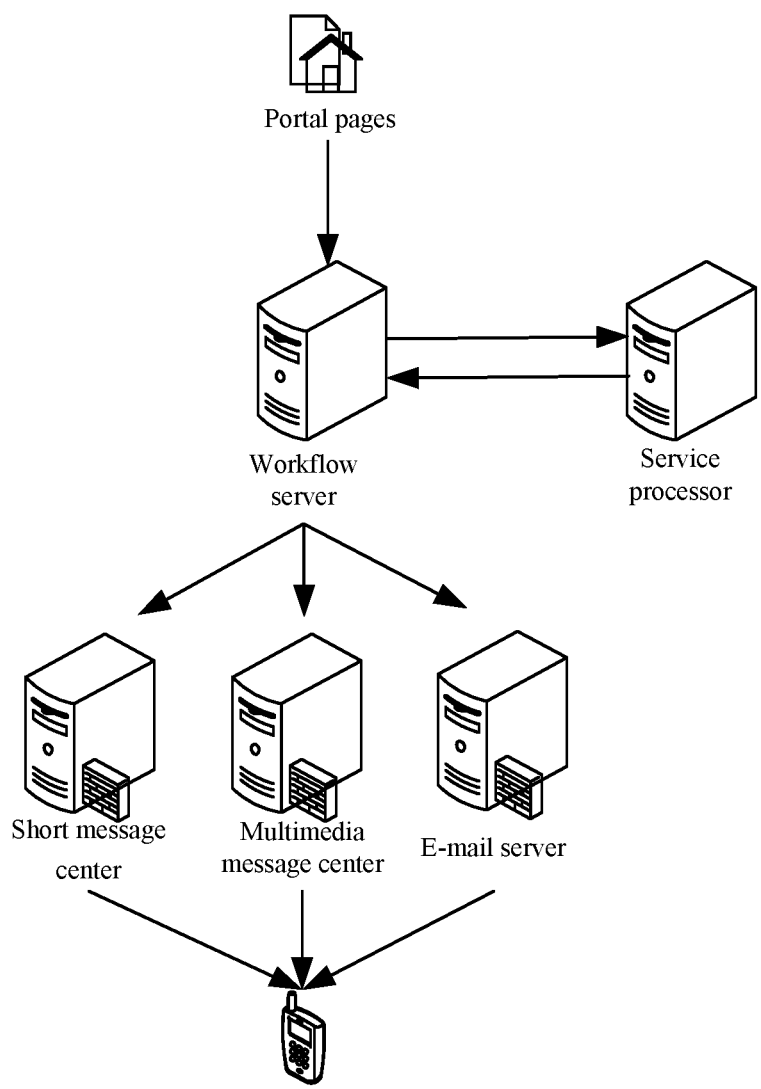
FIG. 7 is a schematic diagram of a networking structure according to a second example embodiment of the disclosure.

The present embodiment will be described with reference to the networking structure shown in FIG. 7. As shown in FIG. 7, the present embodiment is implemented in a manner of Turbo Linux and AIX+Oracle (that is, the Oracle database is installed on the AIX operating system, and a portal database and a service database are combined). In the system, Turbo Linux is used as a workflow server to deploy portal environment and WMS machine (including the abovementioned access control device), and an AIX server is further provided as a service processor system which is connected with the workflow server through a WINNT/TCP (the Transfer Control Protocol (TCP) under Windows NT (WINNT) system). A service processor system runs the Service Logic Process (SLP) process for processing the service, which is mainly used to complete a service triggering function. After the workflow server completes an interaction with the service processor, a message is again sent to a short message center, or a multimedia message center, or a mail server, and finally to a mobile terminal of a user according to a request of a portal page. Through an application of the method for multi-level access control provided by the system, the entire system has greatly enhanced security and confidentiality and created good economic returns.

From the above description, it may be seen that the embodiments of the disclosure achieve the following technical effects.

1. The advantages of an existing access control technology are inherited, and user management is separated from permission management and task management.

2. Tasks in the workflow are combined with roles and operation permissions. The roles and operation permissions that the tasks have exist only in a life cycle of each of the tasks. The operation permission obtained when the task is executed does not exceed the operation permission required for executing the task.

3. In an existing role-based access control technology, a concept of the task is introduced. The role which is a static object is separated from the operation permission. The operation permission is associated with the task which is a dynamic object. In this way, the operation permission keeps the pace with the life cycle of the task and has timeliness, meeting the security needs of a carrier-class application better.

In another embodiment, there is also provided software for carrying out the technical solutions described in the above embodiments and example embodiments.

In another embodiment, there is also provided a storage medium in which the above software is stored, including but not limited to optical disks, floppy disks, hard disks, erasable and writable memories, and the like.

Industrial Applicability: As described above, the embodiments of the disclosure provides a preset correspondence relationship between each of the tasks in a group of tasks and operation permission, and when executing the group of tasks, the subject dynamically obtains the operation permission corresponding to each of the tasks in a group of tasks, and the access to the object is controlled by the operation permission so as to dynamically configure the operation permission corresponding to each of the tasks in the group of tasks, and grant and revoke the operation permission in a timely and accurate manner, avoiding potential insecurity.

Obviously, those skilled in the art should know that each component or step of the embodiment of the disclosure may be implemented by a universal computing device, and the components or steps may be concentrated on a single computing device or distributed on a network formed by a plurality of computing devices, and may optionally be implemented by programmable codes executable for the computing devices, so that the components or steps may be stored in a storage device for execution with the computing devices, and, in some cases, the steps shown or described may be executed in a order different from the order herein, or the components or steps may form each integrated circuit component, or multiple components or steps therein may form a single integrated circuit component for implementation. As a consequence, the disclosure is not limited to any specific hardware and software combination.

The above is only the exemplary embodiment of the disclosure and not intended to limit the disclosure, and for the technician of the field, the disclosure may have various modifications and variations. Any modifications, equivalent replacements, improvements and the like within the spirit and principle of the disclosure shall fall within the scope of protection as defined in the disclosure.

What is claimed is:

1. A method for access control which is performed by a hardware processor, and the method comprises:
   a group of tasks are executed, controlling an access of a subject to an object according to operation permission corresponding to each of the tasks in the group of tasks;
   wherein before the group of tasks are executed, the method further comprises: obtaining the operation permission corresponding to each of the tasks in the group of tasks according to a preset correspondence relationship between each of the tasks in the group of tasks and the operation permission;
   wherein obtaining the operation permission corresponding to each of the tasks in the group of tasks according to the preset correspondence relationship between each of the tasks in the group of tasks and the operation permission comprises:
   obtaining a role corresponding to the subject executing each of the tasks according to a preset correspondence relationship between the subject and the role;
   obtaining a first operation permission corresponding to the role according to a preset correspondence relationship between the role and the operation permission; and
   taking an intersection of a second operation permission corresponding to the task in the preset correspondence relationship between each of the tasks in the group of tasks and the operation permission, and the first operation permission corresponding to the obtained role corresponding to the subject executing the task as the operation permission for each of the tasks.

2. The method as claimed in claim 1, wherein before obtaining the operation permission corresponding to each of the tasks in the group of tasks according to the preset correspondence relationship between each of the tasks in the group of tasks and the operation permission, the method further comprises:
receiving a request for a workflow initiated by the subject; and
obtaining the group of tasks for each process completing the workflow.

3. The method as claimed in claim 2, wherein obtaining the group of tasks for each process completing the workflow comprises: initializing the workflow to generate a workflow instance, and dividing the workflow instance into the group of tasks.

4. The method as claimed in claim 3, wherein dividing the workflow instance into the group of tasks comprises: assigning the group of tasks that need to be executed according to different application programming interfaces called in the workflow instance.

5. The method as claimed in claim 1, wherein controlling the access of the subject to the object according to the operation permission corresponding to each of the tasks comprises:
determining whether the subject is allowed to access to the object according to the operation permission corresponding to a current task in a process of executing each of the tasks; and
executing the access to the object in a case of allowing the subject to access to the object.

6. The method as claimed in claim 5, wherein after executing the access to the object, the method further comprises: revoking the operation permission corresponding to each of the tasks in the group of tasks and ending each of the tasks in the group of tasks.

7. The method as claimed in claim 6, wherein revoking the operation permission corresponding to each of the tasks in the group of tasks comprises:
determining a life cycle of the role according to a level of the role corresponding to the subject executing each of the tasks in the group of tasks; and
revoking the operation permission corresponding to each of the tasks in the group of tasks when the life cycle expires.

8. A device for access control, wherein the device comprises a hardware processor configured to execute program components stored on a memory, and the program components comprise:
a control component arranged to, a group of tasks are executed, control an access of a subject to an object according to operation permission corresponding to each of the tasks in the group of tasks;
wherein the device further comprises: a first obtaining component arranged to obtain the operation permission corresponding to each of the tasks in the group of tasks according to a preset correspondence relationship between each of the tasks in the group of tasks and the operation permission;
wherein the first obtaining component comprises:
a first obtaining element arranged to obtain a role corresponding to the subject executing each of the tasks according to a preset correspondence relationship between the subject and the role;
a second obtaining element arranged to obtain a first operation permission corresponding to the role according to a preset correspondence relationship between the role and the operation permission; and
a calculating component arranged to take an intersection of a second operation permission corresponding to the task in the preset correspondence relationship between each of the tasks in the group of tasks and the operation permission and the first operation permission corresponding to the obtained role corresponding to the subject executing the task as the operation permission for each of the tasks.

9. The device as claimed in claim 8, wherein the device further comprises:
a receiving component arranged to receive a request for workflow initiated by the subject; and
a second obtaining component arranged to obtain the group of tasks for each process completing the workflow.

10. The device as claimed in claim 8, wherein the control component comprises:
a determining element arranged to determine whether the subject is allowed to access to the object according to the operation permission corresponding to a current task in a process of executing each of the tasks; and
an executing element arranged to execute the access to the object in a case of allowing the subject to access to the object.

11. The device as claimed in claim 8, wherein the device further comprises: a revoking component arranged to revoke the operation permission corresponding to each of the tasks in the group of tasks and end each of the tasks in the group of tasks after executing the access to the object.

12. A non-transitory computer storage medium, in which a computer program code is stored and the computer program code is performed by a processor, wherein the program code is arranged to execute the following method:
executing a group of tasks, and controlling an access of a subject to an object according to operation permission corresponding to each of the tasks in the group of tasks;
wherein before the group of tasks are executed, the method further comprises: obtaining the operation permission corresponding to each of the tasks in the group of tasks according to a preset correspondence relationship between each of the tasks in the group of tasks and the operation permission;
wherein obtaining the operation permission corresponding to each of the tasks in the group of tasks according to the preset correspondence relationship between each of the tasks in the group of tasks and the operation permission comprises:
obtaining a role corresponding to the subject executing each of the tasks according to a preset correspondence relationship between the subject and the role;
obtaining a first operation permission corresponding to the role according to a preset correspondence relationship between the role and the operation permission; and
taking an intersection of a second operation permission corresponding to the task in the preset correspondence relationship between each of the tasks in the group of tasks and the operation permission, and the first operation permission corresponding to the obtained role corresponding to the subject executing the task as the operation permission for each of the tasks.

* * * * *